Patented Jan. 25, 1938

2,106,242

UNITED STATES PATENT OFFICE 2,106,242

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application June 21, 1937, Serial No. 149,470

10 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated for use in my present process consists of or comprises a compound of the general formula type:

$$(X)_n.R.T.D.$$

where R represents an aromatic nucleus, X represents an alkyl radical having at least three carbon atoms and not more than sixteen carbon atoms, T is an aliphatic hydrocarbon radical containing not over thirty carbon atoms which is attached directly to R by means of a carbon atom to carbon atom linkage, D represents a radical selected from the class consisting of hydroxyl radicals, carboxyl radicals, sulfonic acid radicals, amine radicals, and quaternary ammonium radicals, and $n$ represents the numeral 1, 2, 3 or 4; and R is additionally characterized by being free from any other substituents.

Products of the kind just referred to for use as demulsifying agents in the present process are well known compositions of matter. They may be obtained in various manners.

When an aryl substituted carboxylic acid is used as starting material the entrance of the alkyl radicals into the aromatic nucleus takes place with intermediate esterification. For instance, by the action of butyl alcohol upon phenyl-acetic acid there is first formed the butyl ester of phenyl-acetic acid, which is transformed into butylphenyl-acetic acid by the action of the condensing agent. Simultaneously with this transformation there is formed by esterification in the presence of an excess of butyl alcohol the butyl ester of butylphenyl-acetic acid, and the latter is in its turn transformed into dibutylphenyl-acetic acid and so forth. The reaction is finished when a product is obtained which, in the form of an alkali metal salt, dissolves in water to give a clear and strongly frothing solution. Likewise, it may be assumed that by the alkylation of sulfonic acids, for instance benzylsulfonic acid, labile sulfonic esters are intermediately formed, though in this case such esters could not be isolated. In this case also the reaction is finished when the product obtained dissolves, in the form of an alkali metal salt, in water to give a clear solution. When a substituted amine or quaternary ammonium compound is used as parent material, a product must be obtained which, in the form of a mineral or organic acid salt, dissolves in water to give a clear solution.

Instead of using phenyl-acetic acid as above described, one may employ ethylphenyl-acetic acid, phenyl-butyric acid, hydrocinnamic acid, naphthyl-acetic acid or acenaphthenyl-acetic acid. Aliphatic radicals may be introduced into the aromatic nucleus in the same manner as is employed in the manufacture of alkylated aromatic sulfonic acids, such as alkylated naphthalene sulfonic acids. Generally speaking, the most usual processes are to combine an alcohol with sulfuric acid, so as to form an acid sulfate and react the acid sulfate with the aromatic material. The corresponding olefine, of course, may replace the alcohol. Similarly, the alkyl halide may also be employed for condensation. The alcohols employed include propyl alcohol, butyl alcohol, amyl alcohol, hexyl alcohol, decyl alcohol, lauryl alcohol, stearyl alcohol, and the various isomeric forms in which these alcohols may appear. As condensing agents, one may employ the usual material such as sulfuric acid, monohydrate, oleum, aluminum chloride, zinc chloride, various boron compounds, etc. In some instances the halide derivatives are more suitable for condensation than either the alcohol or the olefine.

Compounds of the type of mono-, di-, tri-, and tetrapropyl-phenyl acetic acid, mono-, di-, tri-, and tetrabutyl-phenyl-acetic acid, mono-, di-, tri-, and tetrapropyl naphthyl-acetic acid, mono-, di-, tri-, and tetrabutylnaphthyl-acetic acid, diisohexyl-cinnamic acid, etc., containing acidic radicals, may, of course, be converted into salts or esters by replacing the ionizable hydrogen with a suitable metallic atom or a suitable organic radical.

The products of the above general composition may be subjected to a further reaction. In particular, a polyalkylated aromatic carboxylic acid may be condensed, in the form of its acid chloride, with an oxyalkylsulfonic acid, an aminoalkylsulfonic acid or a sulfuric acid ester of an alkylolamine.

Well known procedures by which materials of the kind above described may be produced include the following:

*Example 1.*—150 parts of sulfuric acid monohydrate are added to 68 parts of phenyl-acetic acid and heated, while stirring, to a temperature between 50° C. and 60° C. Then 148 parts of n-butyl alcohol and 300 parts of sulfuric acid monohydrate are run in simultaneously and the whole is then stirred for 12–15 hours. The reaction product is then poured on ice and extracted with ether, the ethereal solution is dried and the ether is evaporated. One thus obtains a yellow residue which solidifies after some time. The product may be assumed to be a mixture of di- and, mainly, tri-iso-butylphenylacetic acid. Instead of n-butyl alcohol the condensation may be performed with isohexyl alcohol.

*Example 2.*—75 parts of hydrocinnamic acid are dissolved in 148 parts of n-butyl alcohol. At 50° C. to 60° C. there are run in in the course of one hour, 275 parts of sulfuric acid monohydrate. The whole is then stirred for 7½ hours at 50° C. to 60° C. and for 8 hours at 75° C. to 85° C. The reaction product is then soluble in caustic soda solution to a clear solution. The product may either be neutralized directly or it may be purified by way of the calcium salt. The tri-iso-butylhydrocinnamic acid, may be obtained.

By using larger quantities of n-butyl alcohol and sulfuric acid monohydrate more highly butylated hydrocinnamic acids, for instance, the tetrabutylhydrocinnamic acid, may be obtained.

*Example 3.*—75 parts of n-butyl alcohol are added gradually, while stirring at 80° C. to a mixture of 93 parts of a-naphthylacetic acid and 845 parts of sulfuric acid of 80 per cent strength and the whole is stirred for further 12 hours at this temperature. The reaction mass is then poured into water and the oil which is formed is precipitated. It is then neutralized with dilute caustic soda solution and the whole is evaporated to dryness.

*Example 4.*—445 parts of phenol-n-valeric acid (obtainable by condensing cinnamic aldehyde with malonic acid, hydrogenating and decarboxylating) are dissolved in 560 parts of n-butanol and, at 50° C. to 60° C., 1040 parts of sulfuric acid monohydrate are added in the course of one hour. The whole is then stirred for 15 hours at 65° C., then poured on ice, worked up in the usual manner and saponified. The butylated phenyl-n-valeric acid obtained has the acid number of 156.0 and a saponification number of 170.2.

*Example 5.*—In the course of 3 hours 880 parts of sulfuric acid of 80 per cent strength are added drop by drop, while stirring, at 80° C. to a mixture of 93 parts of a-naphthylacetic acid and 150 parts of n-butanol and the whole is then stirred for further 15 hours at this temperature. The reaction mass is then poured into water and the oily layer is separated, neutralized with caustic soda solution and the product is then evaporated to dryness. The butylated a-naphthylacetic acid is obtained in the form of a brown powdery mass.

*Example 6.*—34 parts of phenylacetic acid are dissolved in 84 parts of n-dodecylene, 18 parts of water are added and at ordinary temperature boron-trifluoride is passed through the liquid. The temperature rises slowly to 60° C.; the reaction mass which at first is colorless becomes yellowish-brown. The whole is heated for 1–2 hours at 65° C. to 75° C., then poured onto ice and the upper layer is dissolved in ether. The ethereal solution is washed until neutral, dried and the ether is then evaporated. The residue dissolves in dilute caustic soda solution.

*Example 7.*—680 parts of phenylacetic acid are dissolved in 2590 parts of n-butanol and at 50° C. to 60° C. 7800 parts of sulfuric acid monohydrate are added in the course of one hour. The whole is then stirred for 7½ hours at 50° C. to 60° C. and for 8 hours at 65° C. to 70° C. Care must be taken that after the addition of the monohydrate, which entails a stronger reaction, the said temperature is exactly maintained. The product is worked up in a manner similar to that described in Example 1. In order to obtain the product in a pure state, it is saponified with aqueous caustic soda solution and is distilled in a vacuum. A product is thus obtained which distills between 184° C. and 190° C. under 3 mm. pressure.

The reaction product consists for the greater part of tri-iso-butylphenylacetic acid of about the following constitution:

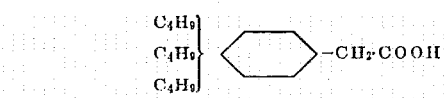

*Example 8.*—By causing tri-iso-butylphenylacetic acid chloride to react with sodium oxethane sulfonate a product of the following constitution is obtained:

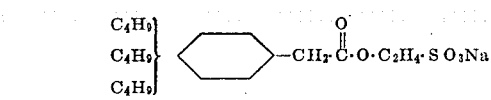

*Example 9.*—172 parts of benzylsulfonic acid (obtainable by reaction of benzyl chloride with sodium sulfite) are dissolved in 300 parts of propyl alcohol and the whole is then run into 600 parts of concentrated sulfuric acid at 60° C. to 65° C. in the course of one hour. Stirring is continued at 65° C. to 75° C. for about 15 hours. The reaction product is poured onto ice, washed with a sodium chloride solution and neutralized. The sodium salt dissolves in water very easily. It probably has the following compositions:

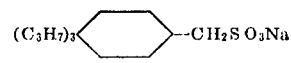

and

*Example 10.*—56 parts of triethyl-benzyl-ammonium chloride are dissolved in 93 parts of n-butyl alcohol and at 50–60° C. 350 parts of sulfuric acid of 98 per cent strength are caused to run in within 1½ hours. The whole is stirred at 65° C. to 70° C., until a test portion taken from the mixture dissolves in water to a clear solution.

*Example 11.*—Tri-isobutyl phenylethylamine is converted into the hydrochloride and employed in such form.

*Example 12.*—Cymene is reacted with ethylene glycol chlorhydrin with the liberation of HCl and entrance of the C₂H₄OH radical into the aromatic nucleus.

*Example 13.*—Glycerol monochlorhydrin is substituted for ethylene glycol chlorhydrin.

It is understood, of course, that in prior examples, where the compounds are derived from monocyclic aromatic compounds, they may be derived just as readily from polycyclic compounds, such as naphthalene instead of benzene, that is, the naphthyl radical is present instead of the phenyl radical.

In the various examples pointed out above, there has been no interruption in the carbon chain of the alkyl radicals. It is possible, of course, that one could employ an alkyl radical or a radical which is essentially alkyl in nature, such as one wherein the carbon atom to carbon atom chain is interrupted by a dissimilar atom, for instance, an oxygen atom. An example of this particular type is illustrated by the use of the chlorhydrin derived from diethylene glycol instead of the chlorhydrin derived from ethylene glycol. In such instance, one is employing a product derived from an ether, and thus there is a carbon-oxygen-carbon linkage; in other words, an alkyl-oxy-alkyl residue instead of an alkyl residue. Similarly, where an alkyl group such as a propyl group or a butyl group, is introduced into the nucleus, one might introduce an interrupted carbon chain compound instead of a homo-atomic chain. Similarly, instead of using a naphthyl compound, one might employ a chlornaphthyl compound. Briefly stated, these various facts may be summarized as follows:

Substituted alkyl radicals or residues may be employed where (1) the presence of the substituent does not prevent the desired reactions from taking place; (2) does not promote some other undesirable reaction; (3) does not prevent the substituted hydrocarbon chain or interrupted hydrocarbon chain from acting in the same manner as the uninterrupted chain, that is, does not prevent the radical or residue from functioning as the equivalent of the unsubstituted alkyl radical or as an uninterrupted chain.

My preferred reagent is prepared in the following manner:

Amylated naphthalene can be purchased in the open market at a relatively low price. It consists of some monoamylated naphthalene, considerable diamylated naphthalene, considerable triamylated naphthalene, and perhaps minor quantities of higher amylated naphthalene. Glycerol dichlorhydrin can be prepared rather inexpensively from sulfur monochloride, see Systematic Organic Chemistry, Cumming, Hopper, and Wheeler, 1931, page 335. When amylated naphthalene is subjected to cautious condensation with glycerol dichlorhydrin in presence of various condensing agents, such as aluminum chloride, zinc chloride, sulfuric acid of various strengths, certain boron compounds, and the like, only one chlorine atom is removed from the glycerol dichlorhydrin. The condensation appears to take place both in the nucleus and in the alkyl radical, although apparently to a much greater extent in the nucleus. The proportions of the two isomeric condensation products appear to depend on the conditions of condensation, relative amount of reagents, etc. Without attempting to indicate the various isomeric forms, and simply by way of illustration, reference will be made to this reaction employing both monoamyl naphthalene and diamyl naphthalene:

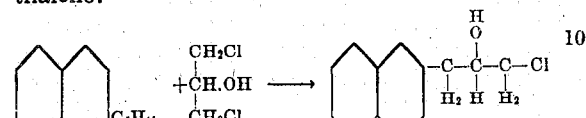

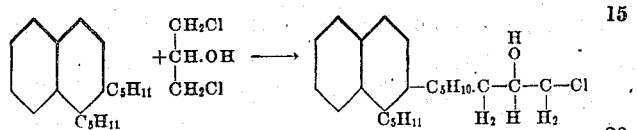

If such a product derived by cautiously controlled condensation is then reacted with hydroxyethane sulfonic acid sodium salt, the following reactions take place:

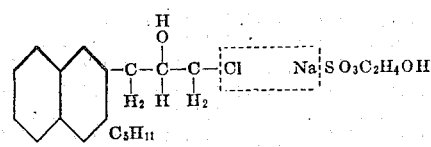

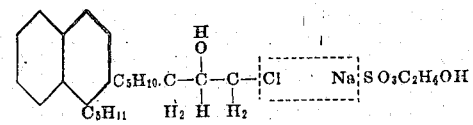

It is also possible that part of the reactions that take place involve the residual hydroxyl of the hydroxy ethane sulfonic acid sodium salt with the formation of compounds which may be indicated by the following reaction:

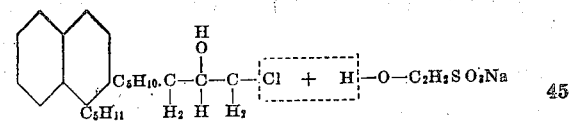

This last formula illustrates such instances where two radicals selected from the class of hydroxyl radicals, carboxyl radicals, sulfonic acid radicals, amine radicals, quaternary ammonium radicals, are attached to the alkyl residue bridge and also indicates an instance where the alkyl residue bridge is more properly identified perhaps as an alkyl residue-oxy-alkyl residue bridge. Hydroxyethane sulfonic acid sodium salt is employed because hydroxyethane sulfonic acid is readily available from carbyl sulfate and all indications are that reagents employed from the above materials, that is, amylated naphthalene, glycerol, sulfur monochloride, hydroxyethane sulfonic acid sodium salt, can be purchased at relatively low cost and will give a variety of desirable compounds.

In the illustrations previously referred to, the product is sometimes shown in the acidic form, that is, as having an ionizable hydrogen atom. The compounds may be used in the acidic state, but in order to prevent corrosion, it is usually desirable that the free acidic hydrogen be replaced by a suitable organic radical or by a metallic atom or by an ammonium radical or by a substituted ammonium radical (amine radical). For instance, such ionizable hydrogen atom may be replaced by an alkyl radical derived from a monohydric alcohol, such as methyl alcohol, ethyl alcohol, propyl alcohol, butyl alcohol, amyl alcohol, hexyl alcohol, etc. The material may be neutralized with any suitable base, such as caustic soda, caustic potash, ammonia, propanolamine, dipropanolamine, tripropanolamine, triethanolamine, diethanolamine, benzylamine, morpholine, amylamine, diamylamine, triamylamine, cyclohexylamine, or the like. One may likewise prepare polyvalent metallic salts, such as iron salts, copper salts, lead salts, calcium salts, magnesium salts, etc. Furthermore, such ionizable hydrogen may be replaced by a residue derived from various polyhydric alcohols. Such polyhydric alcohols may be aliphatic, aromatic, alicyclic, aralkyl, heterocyclic, etc. Suitable polyhydric alcohols include ethylene glycol, glycerol, and the polyhydric alcohol ethers, such as diethylene glycol, diglycerol, etc.

It is to be noted that some of the demulsifying agents of the kind described may be water soluble and substantially oil insoluble. In other instances, where the heavy metal salt is formed or where a high molecular weight amine is used for neutralization, such as triamylamine, the resultant product may be water insoluble and oil soluble. In other instances, the product may show solubility in both oil and water, and in some instances rather limited solubility in either oil or water.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the chemical compound employed as the demulsifying agent of my process may be admixed with one or more of the solvents customarily used in connection with conventional demulsifying agents. Moreover, said chemical compound may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

In practicing my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

It is understood that the use of this process is not limited to any particular isomeric form of the chemical compound or compounds disclosed, but that one isomeric form is as suitable as another.

I desire to point out that the superiority of the reagent used as the demulsifying agent in my process is based upon its ability to treat certain emulsions more advantageously and at a somewhat lower cost than is possible with other demulsifiers, or conventional mixtures thereof. It is believed that the particular demulsifying agent or treating agent herein described will find comparatively limited application so far as the majority of oil field emulsions are concerned; but I have found that such a demulsifying agent has commercial value, as it will economically break or resolve certain oil field emulsions in a number of cases which cannot be treated as easily or at so low a cost with the demulsifying agents heretofore available.

Having thus described my invention, what I claim as new and desire to secure by Letters Patent is:

1. A process for breaking petroleum emulsions of the water-in-oil type, which consists in subjecting the emulsion to the action of a demulsifying agent of the formula type:

$$(X)_n.R.T.D.$$

where R represents an aromatic nucleus; X represents an alkyl radical having at least three carbon atoms and not more than sixteen carbon atoms; T is an aliphatic hydrocarbon radical containing not over thirty carbon atoms which is attached directly to R by means of a carbon atom to carbon atom linkage; D represents a radical selected from the class consisting of hydroxyl radicals, carboxyl radicals, sulfonic acid radicals, amine radicals, and quaternary ammonium radicals; and $n$ represents the numeral 1, 2, 3 or 4; and R is additionally characterized by being free from any other substituents.

2. A process for breaking petroleum emulsions of the water-in-oil type, which consists in subjecting the emulsion to the action of a demulsifying agent of the formula type:

$$(X)_n.R.T.D.$$

where R represents an aromatic nucleus; X represents an alkyl radical having at least three carbon atoms and not more than sixteen carbon atoms; T is an aliphatic hydrocarbon radical containing not over thirty carbon atoms which is attached directly to R by means of a carbon atom to carbon atom linkage; D represents a carboxyl radical; and $n$ represents the numeral 1, 2, 3 or 4; and R is additionally characterized by being free from any other substituent.

3. A process for breaking petroleum emulsions of the water-in-oil type, which consists in subjecting the emulsion to the action of a demulsifying agent of the formula type:

$$(X)_n.R.T.D.$$

where R represents an aromatic nucleus; X represents an alkyl radical having at least three carbon atoms and not more than sixteen carbon atoms; T is an aliphatic hydrocarbon radical containing not over thirty carbon atoms which is attached directly to R by means of a carbon atom to carbon atom linkage; D represents a sulfonic acid radical; and $n$ represents the numeral 1, 2, 3 or 4; and R is additionally characterized by being free from any other substituent.

4. A process for breaking petroleum emulsions of the water-in-oil type, which consists in subjecting the emulsion to the action of a demulsifying agent of the formula type:

$$(X)_n.R.T.D.$$

where R represents an aromatic nucleus; X represents an alkyl radical having at least three carbon atoms and not more than sixteen carbon atoms; T is an aliphatic hydrocarbon radical containing not over thirty carbon atoms which is attached directly to R by means of a carbon atom to carbon atom linkage; D represents a hydroxyl radical; and $n$ represents the numeral 1, 2, 3 or 4; and R is additionally characterized by being free from any other substituent.

5. A process for breaking petroleum emulsions of the water-in-oil type, which consists in subjecting the emulsion to the action of a demulsifying agent of the formula type:

$$(X)_n.R.T.D.$$

where R represents a polycyclic aromatic nucleus derived from naphthalene; X represents an alkyl radical having at least three carbon atoms and not more than sixteen carbon atoms; T is an aliphatic hydrocarbon radical containing not over thirty carbon atoms which is attached directly to R by means of a carbon atom to carbon atom linkage; D represents a radical selected from the class consisting of hydroxyl radicals, carboxyl radicals, sulfonic acid radicals, amine radicals, and quaternary ammonium radicals; and $n$ represents the numeral 1, 2, 3 or 4; and R is additionally characterized by being free from any other substituents.

6. A process for breaking petroleum emulsions of the water-in-oil type, which consists in subjecting the emulsion to the action of a demulsifying agent of the formula type:

$$(X)_n.R.T.D.$$

where R represents a polycyclic aromatic nucleus derived from naphthalene; X represents an alkyl radical having at least three carbon atoms and not more than sixteen carbon atoms; T is an aliphatic hydrocarbon radical containing not over twenty carbon atoms and of the uninterrupted type; D represents a radical selected from the class consisting of hydroxyl radicals, carboxyl radicals, sulfonic acid radicals, amine radicals, and quaternary ammonium radicals; and $n$ represents the numeral 1, 2, 3 or 4; and R is additionally characterized by being free from any other substituents.

7. A process for breaking petroleum emulsions of the water-in-oil type, which consists in subjecting the emulsion to the action of a demulsifying agent of the formula type:

$$(X)_n.R.T.D.$$

where R represents a polycyclic aromatic nucleus derived from naphthalene; X represents an alkyl radical having at least three carbon atoms and not more than sixteen carbon atoms; T is an aliphatic hydrocarbon radical containing not over twenty carbon atoms and of the uninterrupted type; D represents a sulfonic acid radical; and $n$ represents the numeral 1, 2, 3 or 4; and R is additionally characterized by being free from any other substituents.

8. A process for breaking petroleum emulsions of the water-in-oil type, which consists in subjecting the emulsion to the action of a demulsifying agent in the form of a salt of the formula type:

$$(X)_n.R.T.D.$$

where R represents a polycyclic aromatic nucleus derived from naphthalene; X represents an alkyl radical having at least three carbon atoms and not more than sixteen carbon atoms; T is an aliphatic hydrocarbon radical containing not over twenty carbon atoms and of the uninterrupted type; D represents a sulfonic acid radical; and $n$ represents the numeral 1, 2, 3 or 4; and R is additionally characterized by being free from any other substituents.

9. A process for breaking petroleum emulsions of the water-in-oil type, which consists in subjecting the emulsion to the action of a demulsifying agent in the form of a water-soluble salt of the formula type:

$$(X)_n.R.T.D.$$

where R represents a polycyclic aromatic nucleus derived from naphthalene; X represents an alkyl radical having at least three carbon atoms and not more than sixteen carbon atoms; T is an aliphatic hydrocarbon radical containing not over twenty carbon atoms and of the uninterrupted type; D represents a sulfonic acid radical; and $n$ represents the numeral 1, 2, 3 or 4; and R is additionally characterized by being free from any other substituents.

10. A process for breaking petroleum emulsions of the water-in-oil type, which consists in subjecting the emulsion to the action of a demulsifying agent in the form of a sodium salt of the formula type:

$$(X)_n.R.T.D.$$

where R represents a polycyclic aromatic nucleus derived from naphthalene; X represents an alkyl radical having at least three carbon atoms and not more than sixteen carbon atoms; T is an aliphatic hydrocarbon radical containing not over twenty carbon atoms and of the uninterrupted type; D represents a sulfonic acid radical; and $n$ represents the numeral 1, 2, 3 or 4; and R is additionally characterized by being free from any other substituents.

MELVIN DE GROOTE.